(12) United States Patent
Zobell

(10) Patent No.: US 10,864,581 B2
(45) Date of Patent: Dec. 15, 2020

(54) MITER JIG

(71) Applicant: Cory Zobell, Heber City, UT (US)

(72) Inventor: Cory Zobell, Heber City, UT (US)

(*) Notice: Subject to any disclaimer, the term of this patent is extended or adjusted under 35 U.S.C. 154(b) by 3 days.

(21) Appl. No.: 16/242,574

(22) Filed: Jan. 8, 2019

(65) Prior Publication Data

US 2019/0210120 A1   Jul. 11, 2019

Related U.S. Application Data

(60) Provisional application No. 62/614,543, filed on Jan. 8, 2018.

(51) Int. Cl.
*B27G 5/00* (2006.01)
*B23B 47/28* (2006.01)
*B27G 5/02* (2006.01)
*B23Q 9/00* (2006.01)

(52) U.S. Cl.
CPC ............ *B23B 47/287* (2013.01); *B23Q 9/005* (2013.01); *B27G 5/026* (2013.01)

(58) Field of Classification Search
CPC .. B23B 47/287; B23Q 9/0007; B23Q 9/0014; B23Q 9/0042; B23Q 9/005; B23Q 9/0064; B23Q 9/0085; B27F 1/12; B27F 1/14; B27G 5/00; B27G 5/02; B27G 5/026; B27G 5/04; B27B 33/20; B27B 5/04

See application file for complete search history.

(56) References Cited

U.S. PATENT DOCUMENTS

| | | | | |
|---|---|---|---|---|
| 4,461,196 A | * | 7/1984 | Schramm, II | B27G 5/02 83/13 |
| 4,977,938 A | * | 12/1990 | Greeson | B23Q 9/0035 144/136.95 |
| 6,138,372 A | * | 10/2000 | Newman | B23Q 9/005 144/144.1 |
| 2005/0145082 A1 | * | 7/2005 | Moe | B27G 5/02 83/468.3 |

* cited by examiner

*Primary Examiner* — Matthew Katcoff
(74) *Attorney, Agent, or Firm* — Asgaard Patent Services, LLC; F. Wayne Thompson, Jr.

(57) ABSTRACT

Implementations of a miter jig are provided. The miter jig can be used to fabricate a non-perpendicular miter joint, the miter joint being formed by beveling each of two parts (e.g., wooden panels) to be joined to form a corner. By using a miter jig, each of the parts to be joined can be cut to have a bevel angle of up to 80°. In this way, a corner having an acute angle or an obtuse angle can be formed. The miter jig is configured so that it can be secured to a workpiece and comprises a base plate connected to a top plate by a hinge, at least two adjustable brace assemblies configured to set the angle of the top plate relative to the base plate, and a cutting implement guide configured to guide a cutting implement to cut a workpiece at an angle.

18 Claims, 12 Drawing Sheets

US 10,864,581 B2

MITER JIG

CROSS REFERENCE TO RELATED APPLICATION

This application claims the benefit of U.S. Provisional Application Ser. No. 62/614,543, which was filed on Jan. 8, 2018, and is incorporated herein by reference in its entirety.

TECHNICAL FIELD

This disclosure relates to implementations of a jig used to fabricate miter joints. In particular, the present invention is directed to implementations of a jig that may be used to fabricate non-perpendicular miter joints.

BACKGROUND

Mitered joints are often used because they provide aesthetically pleasing joints. A miter joint is used to join two parts (e.g., two pieces of wood or other material) together to form a corner. Typically, a miter joint is a joint occurring at an angle of 90° that is made by beveling each of two parts to be joined, usually at a 45° angle. But traditional miter joints, and the devices used to make them, are of little use when trying to join two parts to form a non-perpendicular corner.

Buildings, furniture, and other structures (e.g., staircases, decorative support beams, counter tops, etc.) that include non-perpendicular corners have become increasingly popular. Therefore, there exists a need for a device that allows for the efficient fabrication of non-perpendicular miter joints.

Accordingly, it can be seen that needs exist for the miter jig disclosed herein. It is to the provision of a miter jig that is configured to address these needs, and others, that the present invention in primarily directed.

SUMMARY OF THE INVENTION

Implementations of a miter jig are provided. The miter jig can be used to fabricate a non-perpendicular miter joint, the miter joint being formed by beveling each of two parts (e.g., wooden panels) to be joined to form a corner. By using the miter jig, each of the parts to be joined can be cut to have a bevel angle of up to 80°. In this way, a corner having an acute angle or an obtuse angle can be fabricated.

The miter jig is configured so that it can be secured to a workpiece and comprises a base plate connected to a top plate by a hinge, at least two adjustable brace assemblies configured to set the angle of the top plate relative to the base plate, and a cutting implement guide configured to guide a cutting implement to cut a workpiece at an angle. The cutting implement guide can be adjustably positioned on the face of the top plate and, in some implementations, fixed in position by provided cam clamps.

In some implementations, each adjustable brace assembly comprises a brace; a brace mount that is secured to the base plate; a bracket that is secured to the top plate; and a cam clamp that can secure the brace to a portion of the bracket and thereby set the angle of the top plate relative to the base plate.

The cutting implement guide comprises a rectangular shaped planar portion and a lip portion that extends from a top side of the planar portion at a right angle. The lip portion of the cutting implement guide serves as a guide (or bearing surface) for a cutting implement (e.g., a router) being used to bevel a workpiece secured to the miter jig.

Another example implementation of the miter jig is configured so that the base plates of two, or more, miter jigs can be interlocked. In this way, multiple miter jigs may be secured end-to-end and thereby configured to accommodate workpieces that are longer than a single miter jig.

BRIEF DESCRIPTION OF THE DRAWINGS

Like reference numerals refer to corresponding parts throughout the several views of the drawings.

DETAILED DESCRIPTION

Figure 1:
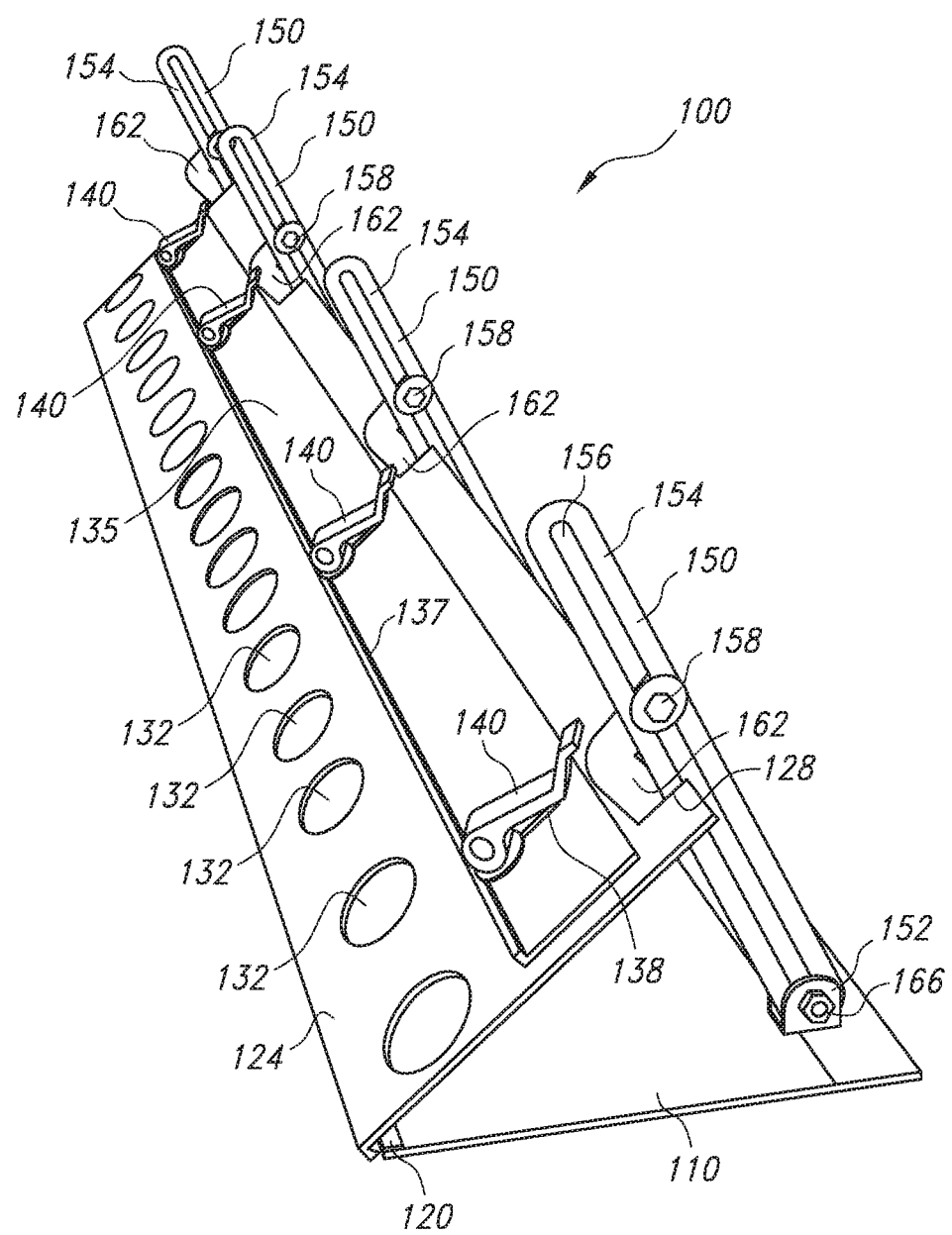
FIG. 1 illustrates a perspective view of a miter jig fabricated according to the principles of the present disclosure.
Figure 2:
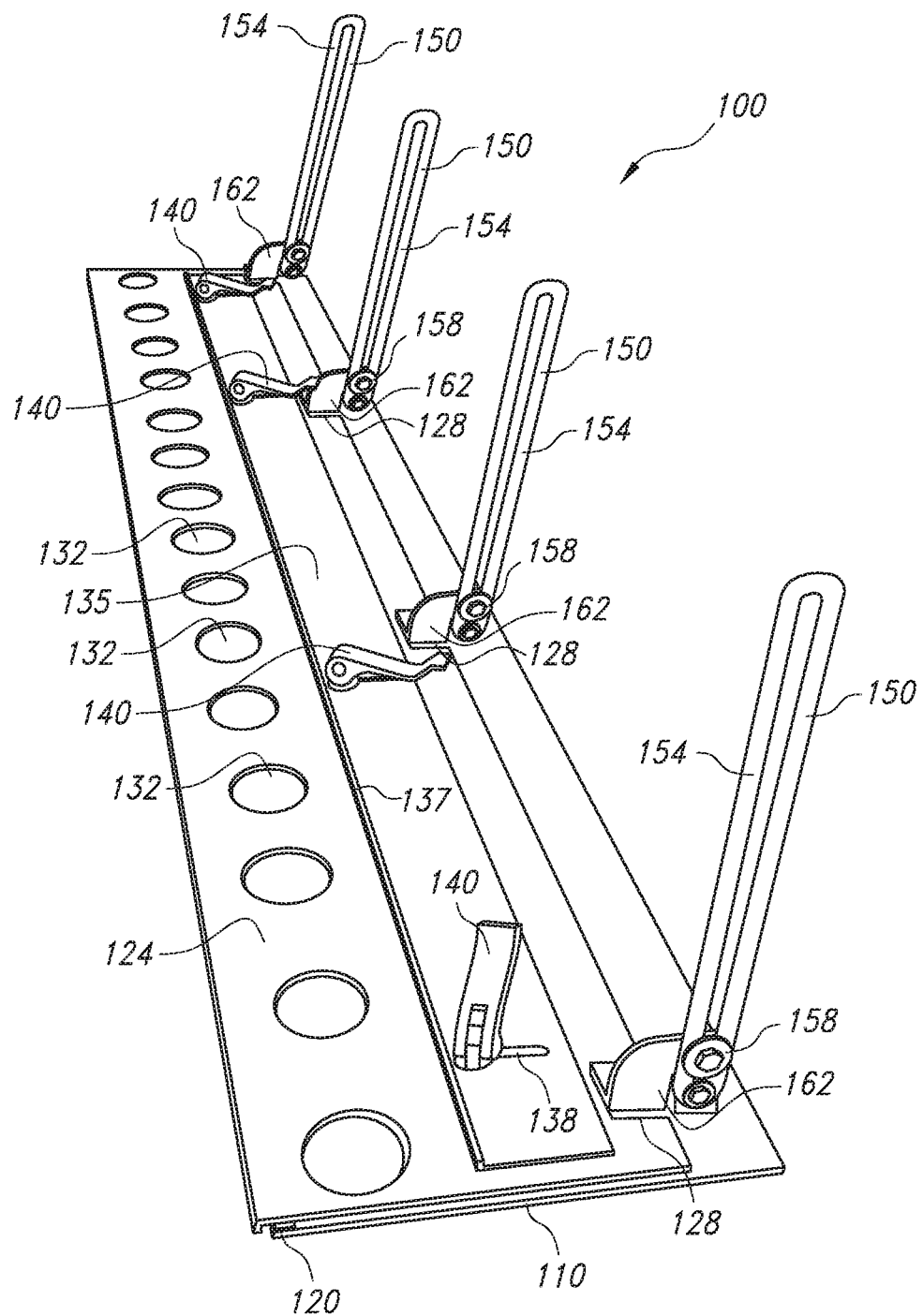
FIG. 2 illustrates another perspective view of the miter jig shown in FIG. 1.
Figure 3:
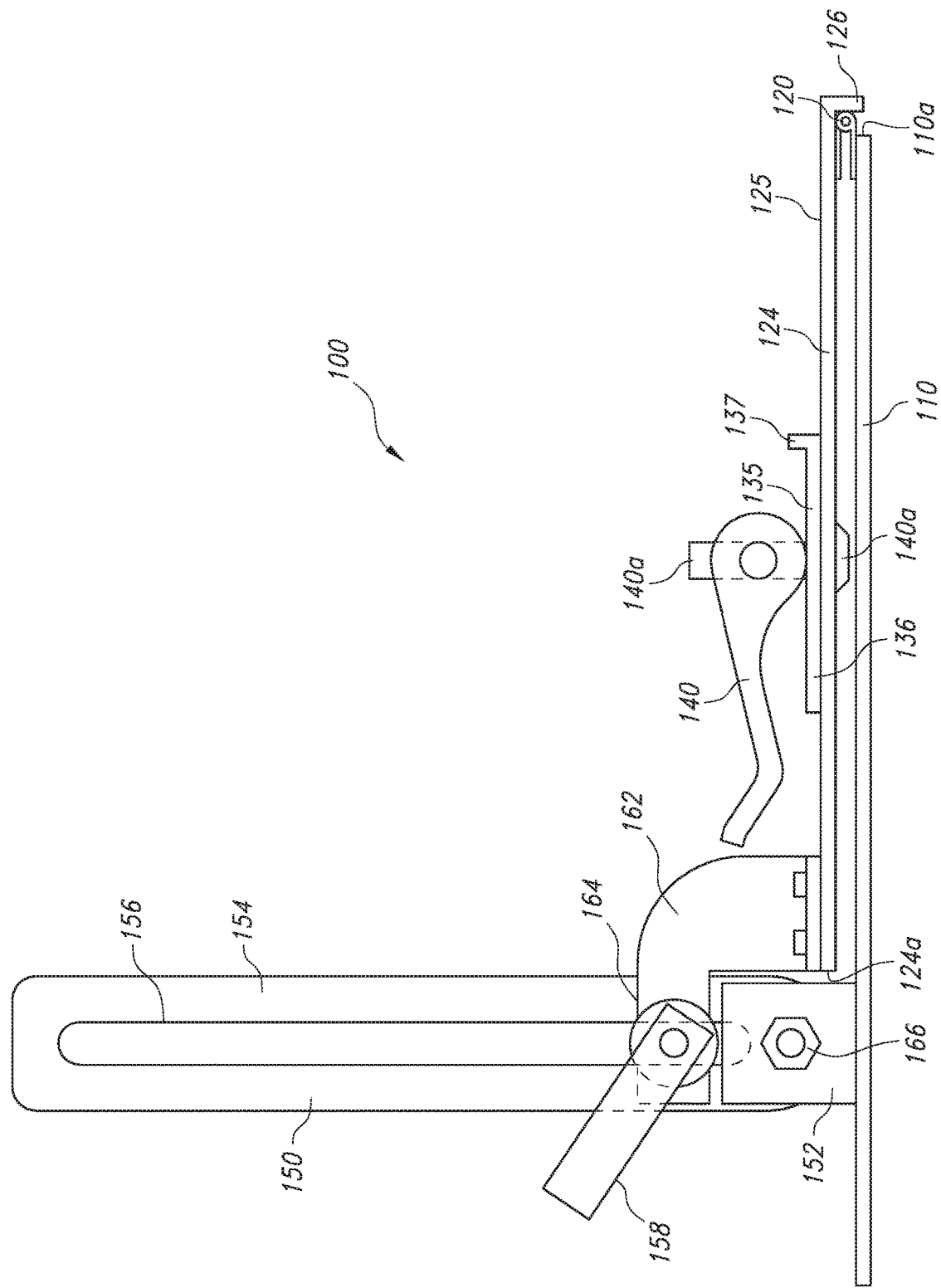
FIG. 3 illustrates a side view of the miter jig shown in FIG. 2.

FIGS. 1-3 illustrate an example miter jig 100 according to the principles of the present disclosure. In some implementations, the miter jig 100 can be used to fabricate a non-perpendicular miter joint, the miter joint being formed by beveling each of two parts (e.g., wooden panels) to be joined to form a corner. In some implementations, by using a miter jig 100, each of the parts to be joined can be cut to have a bevel angle of up to 80°. In this way, for example, cabinets can be fabricated for installation on two intersecting walls forming a non-perpendicular corner.

As shown in FIGS. 1-3, in some implementations, the miter jig 100 is configured so that it can be secured to a workpiece and may comprise a base plate 110 connected to a top plate 124 by a piano hinge 120, four adjustable brace assemblies 150 used to adjust (and set) the angle of the top plate 124 relative to the base plate 110, and a router guide 135 configured to guide a cutting implement to cut a workpiece at an angle. In some implementations, the router guide 135 can be adjustably positioned on the face of the top plate 124 and fixed in position by provided cam clamps 140.

Figure 4A:
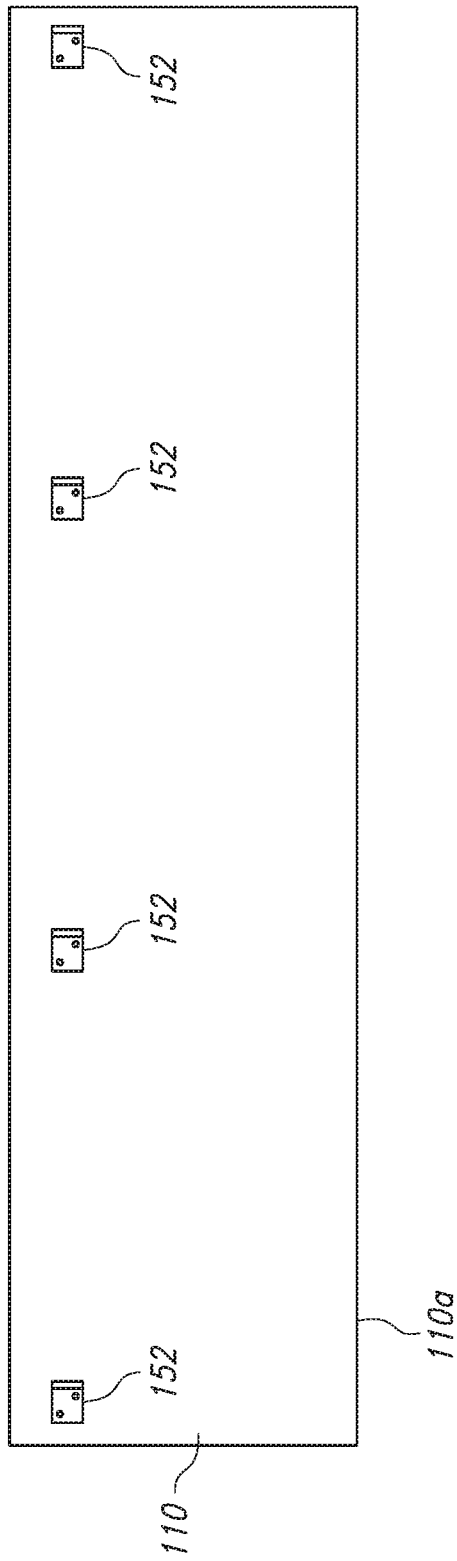
FIG. 4A illustrates a top view of a base plate manufactured according to the principles of the present disclosure, wherein four brace mounts are shown secured to a top side (or face) of the base plate.

As shown in FIGS. 3 and 4A, in some implementations, the base plate 110 of the miter jig 100 may be a rectangular shaped planar member. In some implementations, the base plate 110 may be any shape suitable for being placed on a work surface (e.g., a work bench, a vertical wall, etc.) that does not inhibit the function of the miter jig 100.

Figure 4B:
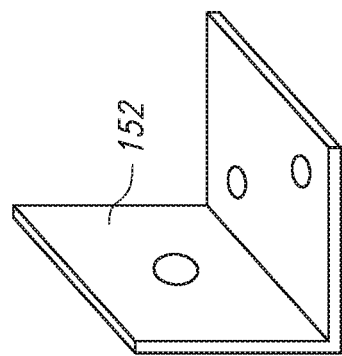
FIG. 4B illustrates a perspective view of a brace mount manufactured according to the principles of the present disclosure.

As shown in FIGS. 3, 4A, and 4B, in some implementations, the face of the base plate 110 may include four brace mounts 152 secured thereto; each brace mount 152 is a component of an adjustable brace assembly 150. In some implementations, the base of each brace mount 152 may be secured to the base plate 110 by one or more fasteners (e.g., a screw). In some implementations, each brace mount 152 may be oriented so that the vertically protruding portion thereof is perpendicular to the face of the base plate 110. In some implementations, there may be more than four, or less than four, brace mounts 122 secured to the base plate 110, the number being dependent on the number of adjustable brace assemblies 150 included as part of a miter jig 100.

As shown in FIG. 3, in some implementations, the piano hinge 120 may be secured to the face of the base plate 120, adjacent to a front edge 110a thereof. In some implementations, the piano hinge 120 may be secured anywhere on the base plate 110 suitable for rotatably connecting the top plate 124 thereto, that does not inhibit the function of the miter jig 100.

Figure 5:
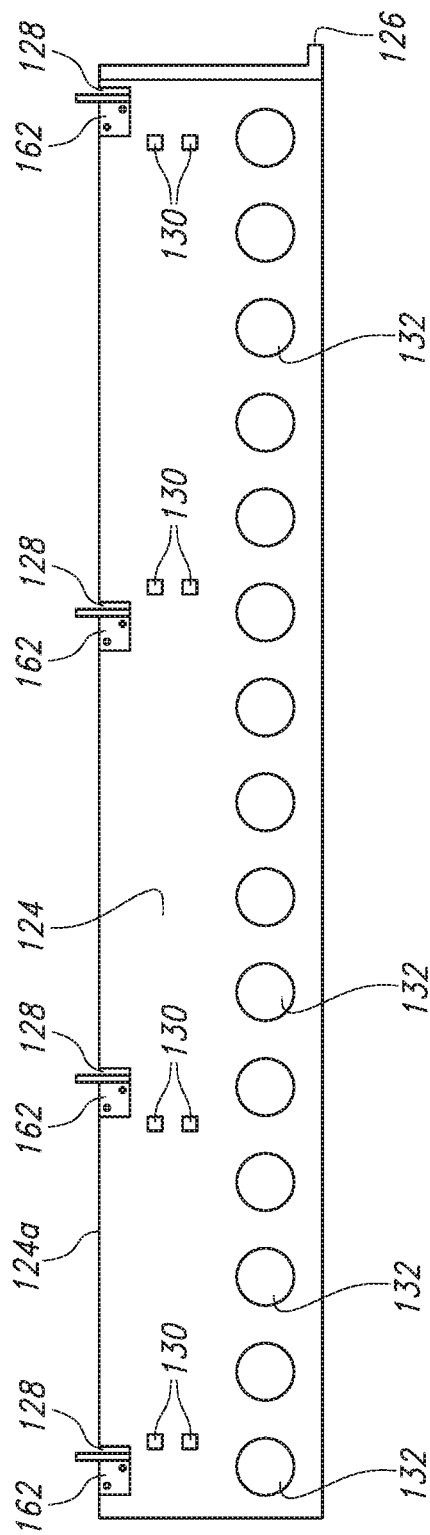
FIG. 5 illustrates a perspective view of a top plate manufactured according to the principles of the present disclosure, wherein four brackets are shown secured to a top side (or face) of the top plate.

As shown in FIGS. 3 and 5, in some implementations, the top plate 124 may comprise a rectangular shaped planar portion 125 and a lip portion 126 that extends from the back side of the planar portion 125. In some implementations, the top plate 124 may further comprise four notches 128 therein that extend from a top edge 124a thereof, four longitudinally spaced pairs of square holes 130, and a plurality of circular holes 132 that extend therethrough.

Figure 10:
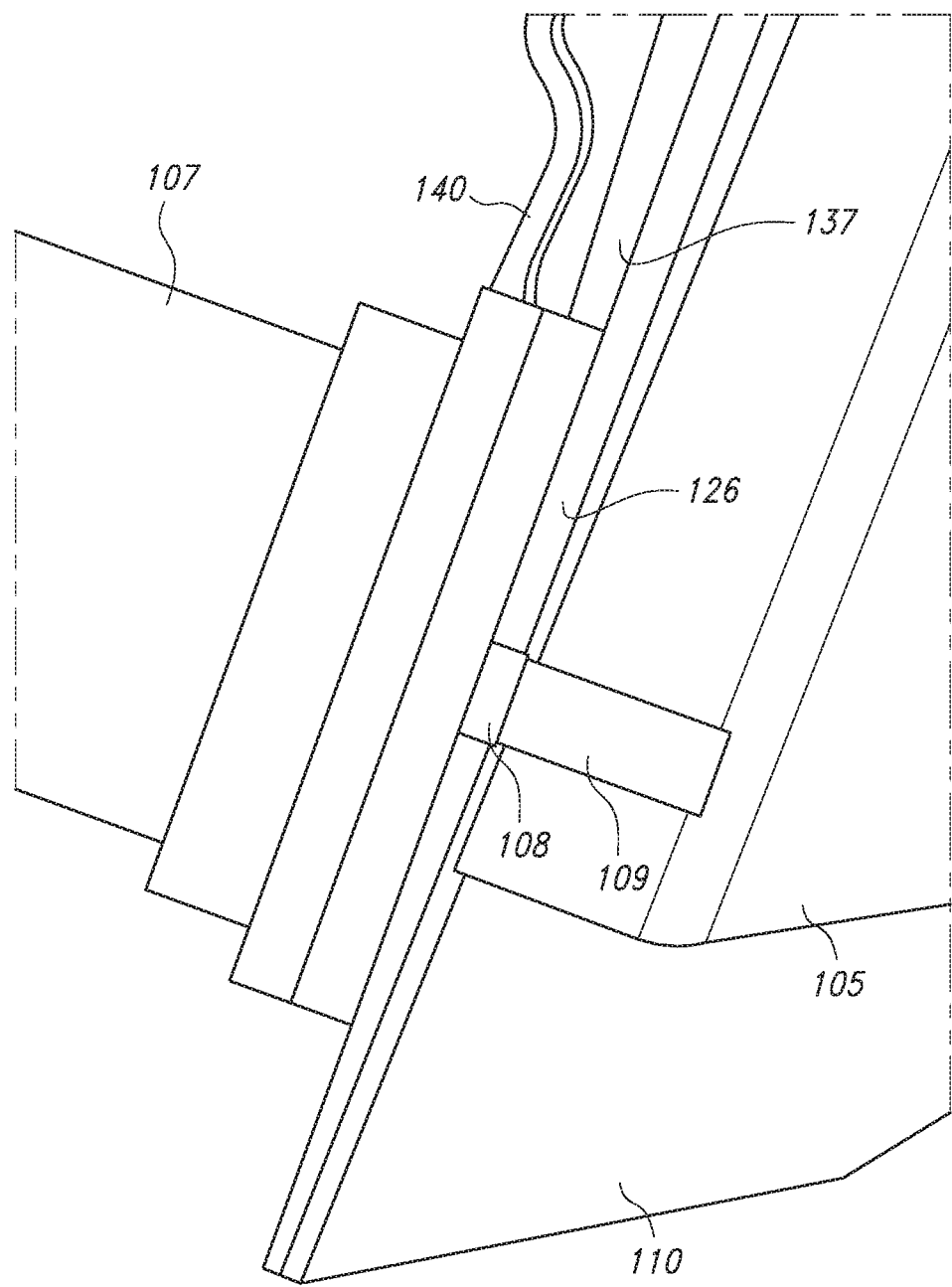
FIG. 10 illustrates a cutting implement (i.e., a router) being used, in conjunction with the miter jig shown in FIG. 1, to bevel an edge of a workpiece.

As shown in FIG. 3, in some implementations, the lip portion 126 of the top plate 124 may be at a right angle relative to the planar portion 125 thereof. In this way, as shown in FIG. 10, the lip portion 126 of the top plate 124 can be used as a bearing surface for a bearing 108 located above the cutting bit 109 of the router 107 being used to bevel a workpiece 105 (e.g., a wood panel, a beam, a length of wood trim, etc.).

As shown in FIG. 1, in some implementations, each notch 128 in the top plate 124 may be configured (e.g., dimensioned) so that at least a portion of a brace 154, of an adjustable brace assembly 150, is able to slide therethrough. In this way, the top edge 124a of the top plate 124 does not make contact with an edge of a brace 154 and thereby limit the top plate's 124 range of motion.

As shown in FIG. 5, in some implementations, the longitudinally spaced pairs of square holes 130 are positioned between the notches 124 in the planar portion 125 of the top plate 124 and the plurality of circular holes 132 located adjacent the lip portion 126. In some implementations, each square hole 130 is configured to allow a portion of a cam clamp 140 carriage bolt 140a to pass therethrough (see, e.g., FIG. 3). In this way, one square hole 130 of each pair may be used to anchor a cam clamp 140 to the top plate 124. In some implementations, each hole 130 may be any shape (e.g., round) suitable for allowing a portion of a cam clamp bolt 140a to pass therethrough. In some implementations, there may be more than eight, or less than eight, holes 130 extending through the top plate 124, the number being, at least, dependent on the number of cam clamps 140 included for use with the router guide 135. For example, in some implementations, there may only be four longitudinally spaced square holes 130 in the top plate 124 (not shown).

As shown in FIG. 5, in some implementations, each square hole 130 of a pair is positioned to provide two different anchor points for a single cam clamp 140. In this way, each hole 130 of a pair provides the router guide 135 of the miter jig 100 with a different range of adjustment relative to the lip portion 126 of the top plate 124 (see, e.g., FIG. 3).

Figure 9:
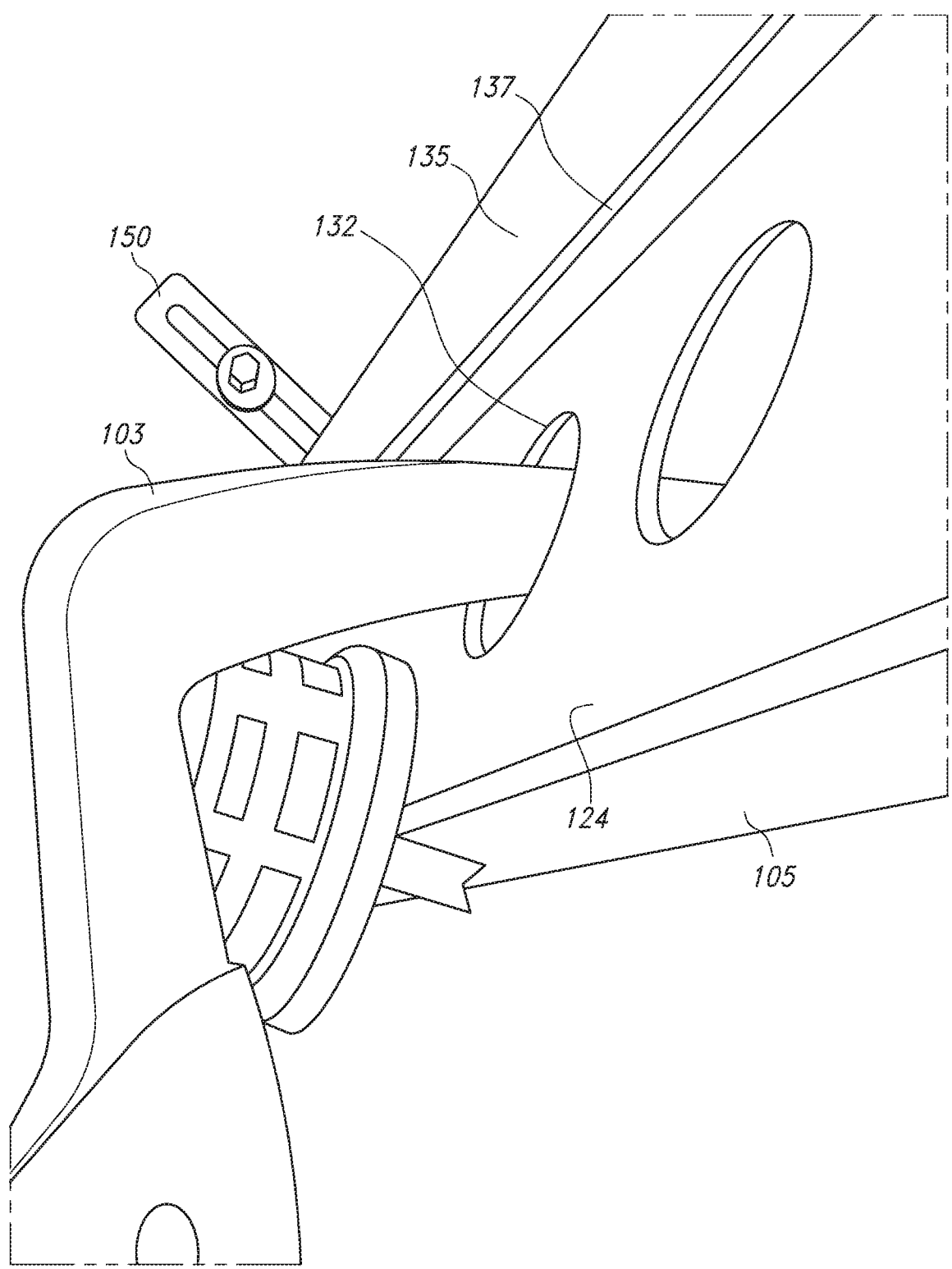
FIG. 9 illustrates a clamp being used to secure the miter jig to a workpiece.

As shown in FIG. 9, in some implementations, each of the circular holes 132 extending through the top plate 124 may be configured (e.g., dimensioned) so that a portion (e.g., a clamp jaw) of a clamp 103 can extend therethrough and be used to secure the miter jig 100 to a workpiece 105.

As shown in FIGS. 1-3 and 5, in some implementations, the planar face of the top plate 124 may include four brackets 162 secured thereto; each bracket 162 is a component of an adjustable brace assembly 150. In some implementations, each bracket 162 is positioned adjacent a notch 128 in the top plate 124. In some implementations, the base of each bracket 162 may be secured to the top plate 124 by one or more fasteners (e.g., a screw). In some implementations, each bracket 162 may be oriented so that the horizontal arm member thereof is extending past a top edge 124a of the top plate 124 (see, e.g., FIGS. 3 and 5). In some implementations, there may be more than four, or less than four, brackets 162 secured to the top plate 124, the number being dependent on the number of adjustable brace assemblies 150 included as part of a miter jig 100.

As shown in FIG. 3, in some implementations, each adjustable brace assembly 150 may comprise a brace 154 having a first end and a guide slot 156, a brace mount 152 configured to rotatably secure the brace 154 to the base plate 110, a bracket 162, and a cam clamp 158.

Figure 7:
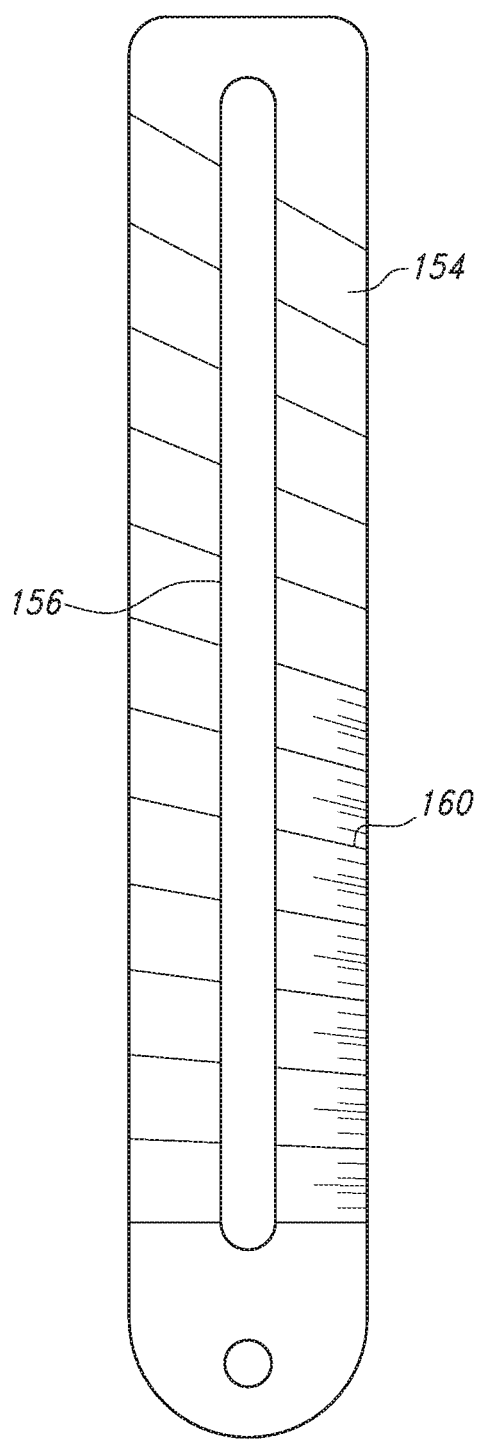
FIG. 7 illustrates a brace manufactured according to the principles of the present disclosure.
Figure 8:
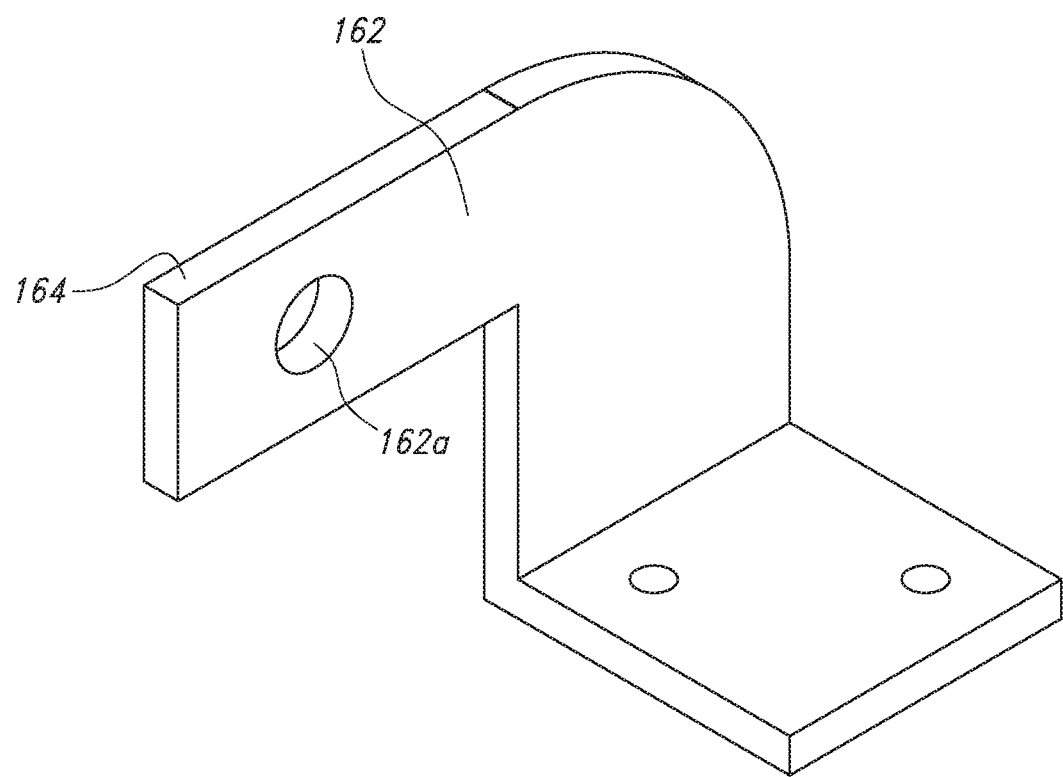
FIG. 8 illustrates a perspective view of a bracket manufactured according to the principles of the present disclosure.

As shown in FIG. 7, in some implementations, each brace 154 may include measurement indicia 160 along at least one side thereof. In some implementations, the measurement indicia 160 may indicate a bevel angle in degrees (e.g., 0° to 80°).

As shown in FIGS. 1 and 3, in some implementations, the first end of each brace 154 is rotatably connected to the vertically protruding portion of a corresponding brace mount 152 by a fastener 166 (e.g., a bolt and a nut).

As shown in FIGS. 1 and 3, in some implementations, a brace 154 may be adjustably secured to the horizontal arm member of a bracket 162 by a cam clamp 158. A cam clamp 158, well known in the prior art, may comprise a cam lever, a flange bolt, a washer, and a threaded cross dowel. In some implementations, the flange bolt of each cam clamp 158 extends through an opening 162a in the bracket 162 and the guide slot 156 of a brace 154. In this way, a cam clamp 158 may be used to removably secure a brace 154 to an adjacent bracket 162 of a miter jig 100 and thereby fix the angle of the top plate 124 relative to the base plate 110.

Figure 6A:
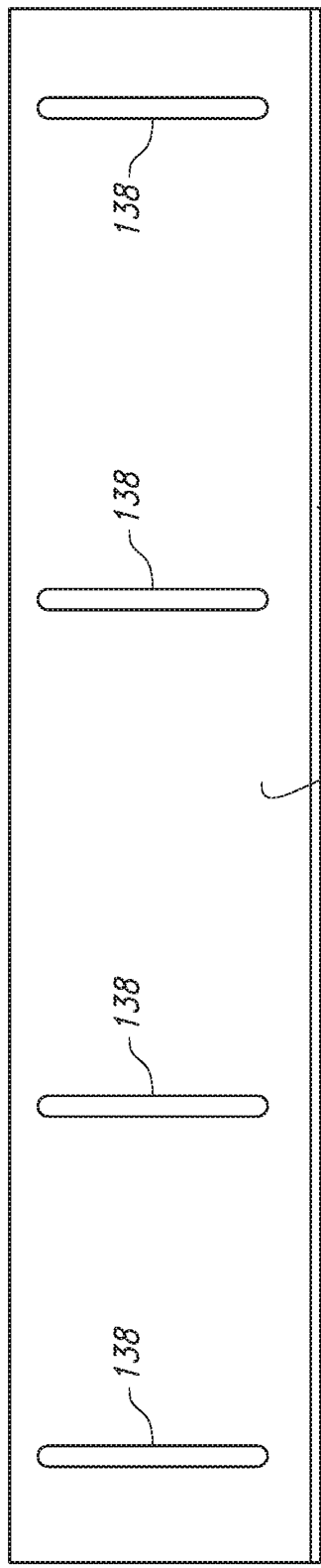
FIG. 6A illustrates a top view of a router guide manufactured according to the principles of the present disclosure.
Figure 6B:
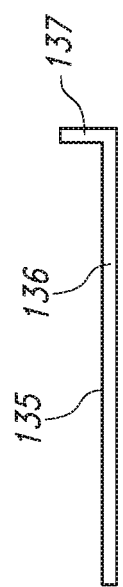
FIG. 6B illustrates a side view of the router guide shown in FIG. 6A.

As shown in FIGS. 3, 6A, and 6B, in some implementations, the router guide 135 may comprise a rectangular shaped planar portion 136 and a lip portion 137 that extends from a first side (or top side) of the planar portion 136. In some implementations, the planar portion of the router guide 135 may include four guide channels 138 therein.

As shown in FIG. 3, in some implementations, the lip portion 137 of the router guide 135 may be at a right angle relative to the face of the top plate 124. In this way, the lip portion 137 of the router guide 135 can serve as a bearing surface for a router 107 (or other cutting implement) being used to bevel a workpiece 105 secured to the miter jig 100 (see, e.g., FIG. 10).

As shown in FIG. 6A, in some implementations, each guide channel 138 may be positioned perpendicular to the longitudinal axis of the router guide 135. In some implementations, each guide channel 138 is configured (e.g., dimensioned) for the shaft of the cam clamp carriage bolt 140a to pass therethrough.

In some implementations, the bevel angle cut by a cutting implement (e.g., a router 107) used in conjunction with a miter jig 100 may be set using the following steps:

Initially, in some implementations, the cam clamp 158 of each adjustable brace assembly 150 is released. In this way, the top plate 124, via the hinge 120, may freely rotate relative to the base plate 110 of the miter jig 100.

Then, in some implementations, the top plate 124 is lifted, rotating about the hinge 120, until the indicator edge 164 (or top edge) of each bracket 162 is positioned over the hash mark of the measurement indicia 164, on an adjacent brace 154, that corresponds to the desired bevel angle.

Next, in some implementations, each cam clamp 158 is engaged thereby securing the bracket 162 to the brace 154. In this way, the angle of the top plate 124 relative to the base plate 110 is set.

In some implementations, the workpiece 105 may be secured to the miter jig 100 before, or after, the bevel angle facilitated by the miter jig 100 is set.

The miter jig 100 may now be used to cut a workpiece 105 at an angle. Or, if needed, the router guide 135 can be positioned on the face of the top plate 124 so that the cutting portion (e.g., the cutting bit 109) of a cutting implement (e.g., a router 107) bearing against the top plate 124 is positioned adjacent to, without making contact with, the lip portion 126 thereof.

In some implementations, the router guide 135 may be adjustably positioned on the face of the top plate 124 using the following steps:

Initially, in some implementations, each router guide cam clamp 140 is released. In this way, the router guide 135 is free to slide up and down on the face of the top plate 124; the router guide's 135 range of movement being limited by the cam clamp carriage bolts 140a extending through the guide channels 138 thereof.

Then, in some implementations, the router guide 135 may be positioned so that the lip portion 137 thereof is a desired distance from the lip portion 126 of the top plate 124. The desired distance between the two lip portions 126, 137 is a function of the cutting implement (e.g., a router, a circular saw, etc.) being used to cut the workpiece. One of ordinary skill in the art, having the benefit of the present disclosure, would know how to determine the desired distance.

Next, in some implementations, each cam clamp 140 is engaged, thereby securing the router guide 135 to the face of the top plate 124. In this way, the router guide 135 can be adjustably positioned on the face of the top plate 124 of a miter jig 100.

In some implementations, the base plate 110, the top plate 124, the router guide 135, the brace mounts 152, the braces 154, the brackets 162, or a combination thereof, may be fabricated from aluminum. In some implementations, the base plate 110, the top plate 124, the router guide 135, the brace mounts 152, the braces 154, the brackets 162, or a combination thereof, may be fabricated from any suitable material (e.g., a steel alloy).

In some implementations, a hinge other than a piano hinge 120 may be used to rotatably secure the top plate 124 to the base plate 110 of a miter jig 100. In some implementations, one or more hinges may be used to rotatably secure the top plate 124 to the base plate 110.

While the present disclosure describes implementations of a miter jig 100 being used in conjunction with a router to bevel parts (e.g., wooded panels) to be joined to form a corner, it should be understood that one or more implementations of the miter jig 100 can be used in conjunction with a circular saw (or other cutting implement) for the same, or similar, purpose.

Figure 11:
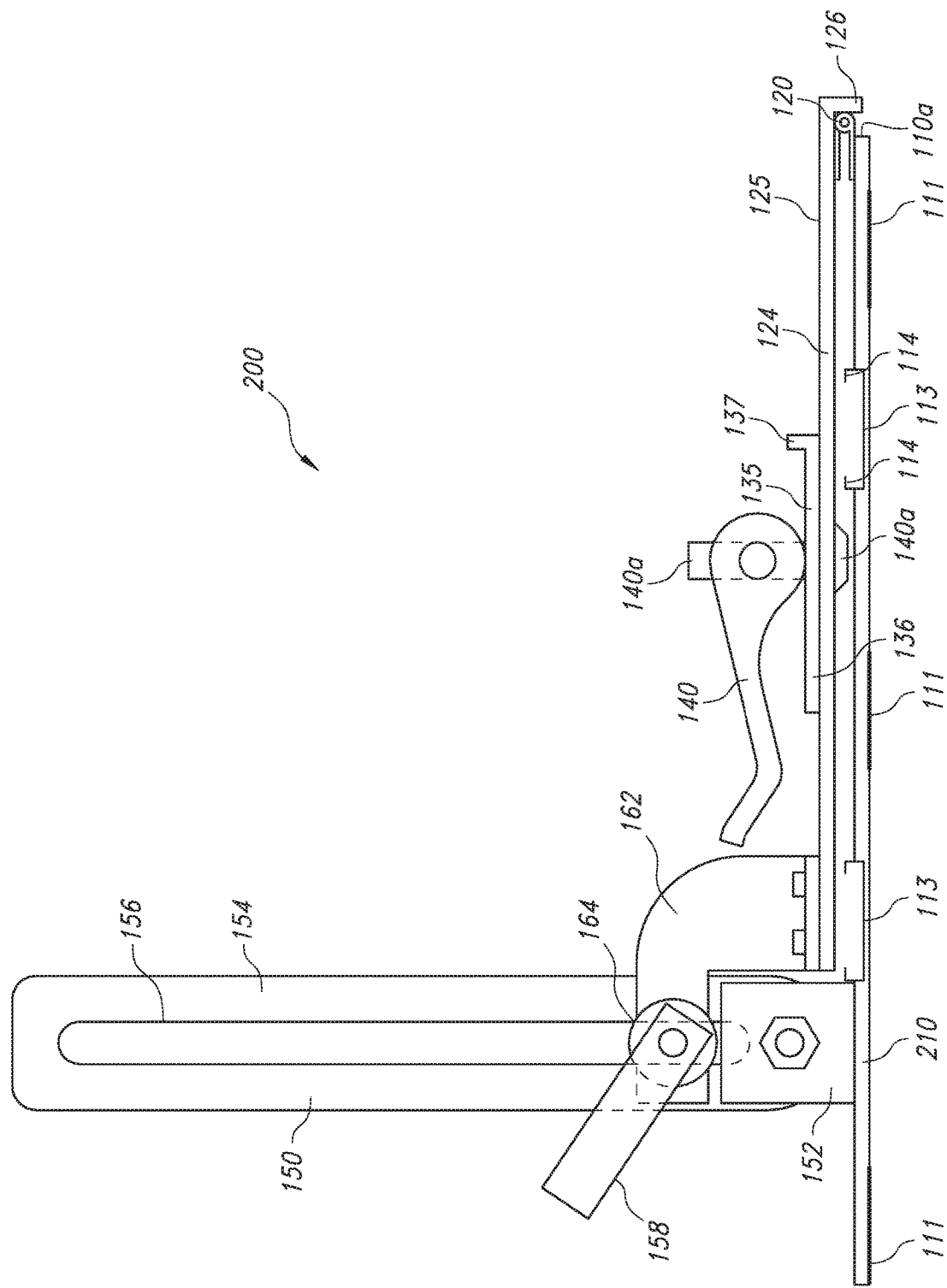
FIG. 11 illustrates a side view of another example miter jig fabricated according to the principles of the present disclosure, wherein the guide grooves in the face of the base plate are shown.
Figure 12:
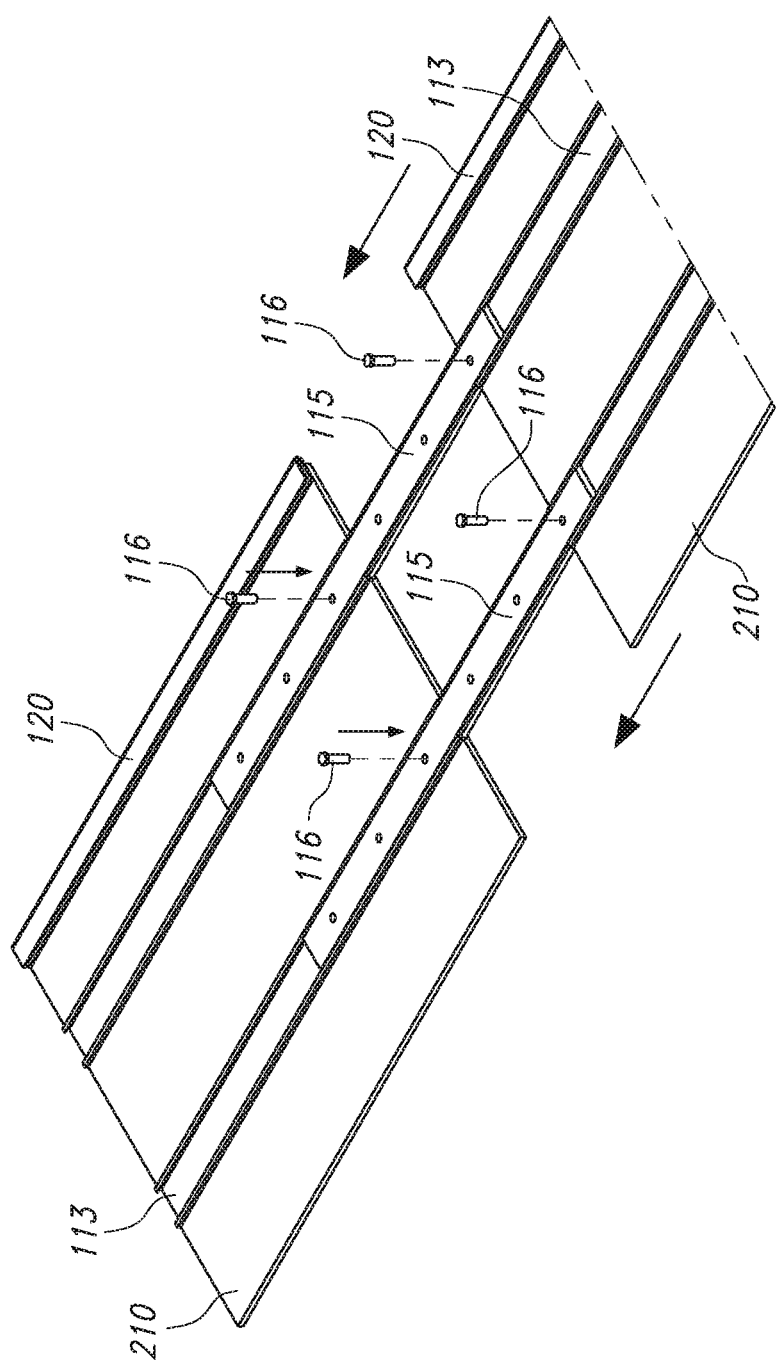
FIG. 12 illustrates an exploded view of two base plates being interlocked together.

FIGS. 11 and 12 illustrates another example implementation of a miter jig 200 fabricated in accordance with the present disclosure. In some implementations, the miter jig 200 is similar to the miter jig 100 discussed above but the base plate 210 is configured to interlock with the base plate 210 of another miter jig 200 positioned adjacent thereto. In this way, multiple miter jigs 200 may be secured end-to-end and thereby configured to accommodate workpieces that are longer than a single miter jig 200 can accommodate.

As shown in FIGS. 11 and 12, in some implementations, the face of a base plate 210 may further comprise two longitudinally extending guide grooves 113 therein. In some implementations, each guide groove 113 is configured to receive therein a portion of a locking bar 115 that can be used to interlock two adjacent base plates 210 together. In some implementations, each locking bar 115 is configured to slide within a guide groove 113 and to be secured therein by one or more fasteners 116 (e.g., set screws). In some implementations, when the set screws 116 are tightened, the locking bar 115 is pressed against the lips 114 of the guide groove 113 and thereby secured in position.

As shown in FIG. 12, the base plates 210 for two miter jigs 200 can be interlocked by positioning them so that the guide grooves 113 thereof are aligned. A portion of each locking bar 115 is positioned within two adjacent guide grooves 113 and secured in position with the provided set screws 116.

As shown in FIG. 11, in some implementations, the base plate 210 of the miter jig 200 may include pieces (or strips) of anti-skid rubber 111 material on the underside thereof.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A miter jig for use with a cutting implement, the miter jig can be secured to a workpiece, the miter jig comprising:
    a base plate that rest on the workpiece;
    a top plate connected to the base plate by a hinge;
    at least two adjustable brace assemblies configured to set the angle of the top plate relative to the base plate; and
    a cutting implement guide positioned on the top plate, the cutting implement guide comprising a planar portion and a lip portion that extends from a front side of the planar portion at a right angle, the lip portion is used to guide the cutting implement to cut the workpiece at a first angle;
    wherein the cutting implement guide can be adjustably positioned on a top side of the top plate.

2. The miter jig of claim 1, wherein each adjustable brace assembly comprises a brace; a brace mount that is secured to the base plate; a bracket that is secured to the top plate; and a cam clamp that can secure the brace to a portion of the bracket and thereby set the angle of the top plate relative to the base plate.

3. The miter jig of claim 2, wherein at least one brace includes measurement indicia thereon.

4. The miter jig of claim 2, wherein a first end of each brace is rotatably connected by a fastener to one of the brace mounts secured to the base plate.

5. The miter jig of claim 2, wherein the cam clamp of each adjustable brace assembly includes a flange bolt, a portion of the flange bolt extends through an opening in the bracket and a guide slot in the brace.

6. The miter jig of claim 1, wherein the hinge is secured to a top side of the base plate, adjacent to a front edge thereof.

7. The miter jig of claim 1, wherein the top plate comprises a planar portion and a lip portion extending from a back side of the planar portion at a right angle, the lip portion is configured to serve as a bearing surface for a portion of the cutting implement.

8. The miter jig of claim 1, wherein the planar portion of the top plate includes a plurality of openings therein, each opening is configured so that a portion of a clamp can extend therethrough and be used to secure the miter jig to the workpiece.

9. The miter jig of claim 1, wherein the base plate is configured to interlock with a base plate of a second miter jig.

10. A miter jig for use with a cutting implement, the miter jig can be secured to a workpiece, the miter jig comprising:
    a base plate that rest on the workpiece;
    a top plate connected to the base plate by a hinge;
    at least two adjustable brace assemblies configured to set the angle of the top plate relative to the base plate; and
    a cutting implement guide positioned on the top plate, the cutting implement guide comprising a planar portion and a lip portion that extends from a front side of the planar portion at a right angle, the lip portion is used to guide the cutting implement to cut the workpiece at a first angle;
    wherein the cutting implement guide can be adjustably positioned on a top side of the top plate;
    wherein each adjustable brace assembly comprises a brace; a brace mount that is secured to the base plate; a bracket that is secured to the top plate; and a cam clamp that can secure the brace to a portion of the bracket and thereby set the angle of the top plate relative to the base plate;
    wherein at least one brace includes measurement indicia thereon.

11. The miter jig of claim 10, wherein a first end of each brace is rotatably connected by a fastener to one of the brace mounts secured to the base plate.

12. The miter jig of claim 10, wherein the cam clamp of each adjustable brace assembly includes a flange bolt, a portion of the flange bolt extends through an opening in the bracket and a guide slot in the brace.

13. The miter jig of claim 10, wherein the hinge is secured to a top side of the base plate, adjacent to a front edge thereof.

14. The miter jig of claim 10, wherein the top plate comprises a planar portion and a lip portion extending from a back side of the planar portion at a right angle, the lip portion is configured to serve as a bearing surface for a portion of the cutting implement.

15. The miter jig of claim 10, wherein the planar portion of the top plate includes a plurality of openings therein, each opening is configured so that a portion of a clamp can extend therethrough and be used to secure the miter jig to the workpiece.

16. The miter jig of claim 10, wherein the base plate is configured to interlock with a base plate of a second miter jig.

17. The miter jig of claim 1, further comprising one or more cam clamps, the one or more cam clamps are used to fix the cutting implement guide in position on the top plate.

18. The miter jig of claim 10, further comprising one or more cam clamps, the one or more cam clamps are used to fix the cutting implement guide in position on the top plate.

* * * * *